United States Patent
van der Boom et al.

(10) Patent No.: US 6,746,706 B1
(45) Date of Patent: Jun. 8, 2004

(54) FOOD COMPOSITIONS FORTIFIED WITH ANTI-OXIDANTS

(75) Inventors: Stella van der Boom, Vlaardingen (NL); Manon Johanna Zeelenberg-Miltenburg, Vlaardingen (NL)

(73) Assignee: Lipton, division of Conopco, Inc., Englewood Cliffs, NJ (US)

( * ) Notice: Subject to any disclaimer, the term of this patent is extended or adjusted under 35 U.S.C. 154(b) by 0 days.

(21) Appl. No.: 09/868,841

(22) PCT Filed: Dec. 2, 1999

(86) PCT No.: PCT/EP99/09563

§ 371 (c)(1),
(2), (4) Date: Sep. 24, 2001

(87) PCT Pub. No.: WO00/36936

PCT Pub. Date: Jun. 29, 2000

(30) Foreign Application Priority Data

Dec. 22, 1998 (EP) .............................. 98204420

(51) Int. Cl.$^7$ ................................ A23D 9/00
(52) U.S. Cl. ................. 426/602; 426/601; 426/417
(58) Field of Search ................. 426/601, 602, 426/417, 603, 599

(56) References Cited

U.S. PATENT DOCUMENTS

| | | | | |
|---|---|---|---|---|
| 6,162,480 A | * | 12/2000 | van Buuren et al. | 426/330.6 |
| 6,165,475 A | * | 12/2000 | Crea et al. | 424/769 |
| 6,361,803 B1 | * | 3/2002 | Cuomo et al. | 424/725 |
| 6,416,808 B1 | * | 7/2002 | Crea | 426/601 |

FOREIGN PATENT DOCUMENTS

| | | |
|---|---|---|
| EP | 0 811 678 | 12/1997 |
| EP | 0 849 353 | 12/1997 |
| EP | 0 933 419 | 1/1999 |
| ES | 2125815 | 3/1999 |
| FR | 2 337 509 | 1/1976 |
| JP | 5921368 | 3/1984 |
| JP | 61015732 | 12/1986 |
| WO | 97/06697 | 2/1997 |
| WO | 97/32947 | 9/1997 |
| WO | 99/30724 | 6/1999 |
| WO | 99/52377 | 10/1999 |

OTHER PUBLICATIONS

International Search Report.
JAOCS, vol. 72, No. 10, 1995, pp. 1131–1137 "Effect of Natural Antioxidants in Virgin Olive Oil on Oxidative Stability of Refined, Bleached, and Deodorized Olive Oil" by Statue et al. ; XP–002104286.
O.C.L. Oleagineux Corps Gras Lipides, vol. 35, No. 8/09, Sep. 1, 1988, pp. 339–344, "Contribution a l'etude comparative des pouvoirs antioxydants dans ;'huile d'olive du tyrosol de l'hydroxytyrosol, de l'acide cafeique de l'oleuropeine et du B.H.T.", Chimi et al.; XP 002035222.
International Search Report.

* cited by examiner

Primary Examiner—Carolyn Paden
(74) Attorney, Agent, or Firm—Milton L. Honig

(57) ABSTRACT

Food composition containing 20–100 wt. % of an aqueous phase characterized by an enhanced content of tyrosol and hydroxytyrosol in aqueous phase being at least 15 ppm. The aqueous phase preferably results from exposing olive oil that contains polyphenols under hydrolytic conditions to an aqueous phase, so that lipophilic phenolic compounds will hydrolise and will migrate as hydrophilic polyphenols to the aqueous phase. The invention is suited for enhancing the nutritional value particularly of spreads, processed tomato products and dressings.

5 Claims, No Drawings

FOOD COMPOSITIONS FORTIFIED WITH ANTI-OXIDANTS

The present invention deals with processed food compositions, which contain an enhanced content of anti-oxidants, particularly of phenolic compounds which originate from olive oil. Such compositions fit in a healthy diet.

BACKGROUND OF THE INVENTION

The incidence of cardiovascular diseases in a population is correlated with the occurrence of a high blood cholesterol content. The blood cholesterol level has been found to be decreased by a diet, which contains specific food components. For example, it is recommended to eat fats with a high content of unsaturated fatty acids. It is known further that particularly diets which contain olive oil are healthy, because olive oil consumption contributes to a good balance of HDL cholesterol and LDL cholesterol in the blood. Recently it has been found that some minor fat components particularly the anti-oxidants, including polyphenols from fat, positively interfere with the body's cardiovascular system, particularly because they are believed to help control oxidation of blood cholesterol. Non-refined olive oil has a high content of phenolic compounds which often are denoted as phenolics or as polyphenols.

Copending WO 99/32589 describes a practical application of said finding. The invention relates to spreads which contain olive oil as well as phenolic compounds. Traditionally for spread preparation a fully refined olive oil is employed, with the effect that together with the impurities also the beneficial phenolic compounds are removed. Said patent application describes a mild refining process which delivers a purified oil from which undesired olive oil odour and most of the free fatty acids have been removed, but which still contains a considerable amount of healthy phenolic compounds.

The phenolics derived from olive oil form a group of chemical compounds, some of which have a relatively high oil solubility, the lipophilic phenolic compounds, while others are more soluble in water, the hydrophilic phenolic compounds. When olive oil is contacted with a water phase, e.g. during a water washing step, a partioning of phenolic compounds occurs. A great part of the hydrophilic phenolic compounds easily migrate to the water phase, while the major part of the lipophilic phenolic compounds stay in the oil phase.

At least a part of the bitter taste of olive oil is ascribed to phenolic compounds, mainly to the lipophilic phenolic compounds.

In the co-pending patent applications EP 849353 and EP 933419 olive oil processes are described, which aim at debittering the oil by removing and/or hydrolysing the lipophilic phenolic compounds in olive oil. By hydrolysis the bitter lipophilic phenolic compounds are converted into less bitter and more water soluble phenolic compounds. Since these migrate to the water phase of the olive oil/water mixture, they are removed when the separated water phase is discarded.

WO 97/06697 teaches a healthy diet consisting of food products which have been fortified with high amounts of anti-oxidants, including phenolic compounds. The only phenolic compounds disclosed are catechins which are the water-soluble polyphenols originating from tea. The hydrophilic phenolic compounds used in the present invention originate from olives, they have a different chemical identity and are believed to play a different nutritional and metabolic role. The hydrophilic phenolic compounds from olives consist mainly of tyrosol and hydroxytyrosol. For food fortification tea polyphenols are less attractive, because tea is an expensive source material.

Non-prepublished patent application WO 99/30724 has disclosed generally a mixture of hydrophilic polyphenols of different origin to be used in a diet which aims to protect against cardiovascular afflictions.

Although since long food compositions have been prepared with unrefined virgin olive oil, the presence in such foods of hydrophilic phenolic compounds from olives have remained long unnoticed. In the aqueous phase of food compositions hydrophilic phenolic compounds can be found, but only in relatively low amounts. When both a fat phase and an aqueous phase are present in said food composition, under the conditions under which the food is prepared and stored the content of hydrophilic phenolics might increase slightly. They are formed by hydrolysis of lipophilic phenolic compounds, particularly at the interface of oil and water phases. The level of hydrophilic-phenolics depends on the type of food.

The present invention particularly deals with salad dressings, emulsion spreads and processed tomato compositions. The salad dressings mentioned in this specification are the well known sour tasting food compositions containing a water phase of at least 20 wt. % and having a pourable or a spoonable consistency. Salad dressings often contain a dispersed fat phase, even up to about 80 wt. % (mayonnaise). When dressings are prepared with much virgin, unrefined olive oil, they contain relatively much water soluble olive oil phenolic compounds. However, the content of tyrosol and hydroxytyrosol present in water phase is always less than 100 ppm.

The water and oil emulsion spreads are food products which have a plastic consistency and often consist of a W/O-emulsion containing dispersed fat even up to 80 wt. %. The processed tomato products include sauces, like ketchup, which contain no or only a small amount of dispersed fat. For spreads and processed tomato products unrefined olive oil is a rare and minor ingredient. Up to now the content of tyrosol and hydroxytyrosol in the water phase of these products has never surpassed 15 ppm.

SUMMARY OF THE INVENTION

The present invention is based on the finding that hydrophilic phenolic compounds which originate from olive oil are a useful food ingredient, because they have a nutritional functionality which is comparable with and supplementary to the functionality of the lipophilic phenolic compounds from olive oil. The present invention comprises use of hydrophilic phenolic compounds for the preparation of a food composition with an increased nutritional value.

The food composition according to the invention comprises 20–100 wt. % of an aqueous phase which aqueous phase contains hydrophilic olive polyphenols in concentrations which, in aqueous phase, are at least 15 ppm.

The hydrophilic olive polyphenols are tyrosol and hydroxytyrosol and the food composition preferably is a processed food composition chosen from the group consisting of water and oil emulsion spreads, processed tomato products and salad dressings, the concentration of tyrosol and hydroxytyrosol taken together in aqueous phase is at least 100 ppm for salad dressings and at least 15 ppm for water and oil emulsion spreads and for processed tomato products.

Food compositions according to the invention can be prepared by the steps of selecting the usual ingredients and processing these in the usual way, with the proviso that at least one of the ingredients must consist of or contain tyrosol and hydroxytyrosol in such concentration that in the final composition the concentration of tyrosol and hydroxytyrosol taken together has a value as specified above.

DETAILS OF THE INVENTION

In olive oil derived food compositions often hydrophilic phenolic compounds are present. Tyrosol and hydroxytyrosol are the major representatives. After an aqueous phase has exchanged polyphenols with unrefined olive oil, at least one and mostly both of these two polyphenols are present. Hydrophilic olive derived phenolic compounds are present as such in the olive fruit. They may be formed also after processing of the olive fruits by hydrolysis of lipophilic phenolic compounds such as oleuropein and aglycon.

For the preparation of the invented food compositions hydrophilic phenolic compounds are used suitably in the form of a ready aqueous solution. A suitable and easily available water phase which contains an high level of hydrophilic phenolic compounds is the aqueous phase resulting from separating an O/W-emulsion that comprises an oil consisting wholly or partially of unrefined olive oil and water.

Such water phase is e.g. the aqueous liquid which remains after debittering olive oil by hydrolysis of its bitter ingredients according to the inventions referred to earlier in this specification. Before the invention found an application for those liquids, they were of no use and were discarded as waste.

Another aqueous phase containing hydrophilic phenolic compounds results from the common production process of olive oil. The aqueous phase collected after the steps of malaxation of olive fruits and subsequent olive oil separation was also considered waste material, but it has appeared to be a rich source of phenolic compounds. These can be harvested from the waste water or the water can be used as such, if necessary after purification.

A feasible and efficient alternative for the above aqueous phases is adding tyrosol and hydroxytyrosol as such, particularly as a more or less purified isolate, e.g. in the form of a dry preparation, such as a powder whether or not in admixture with other hydrophilic phenolic compounds.

The invention also comprises a process in which the aqueous phase does not contain either tyrosol or hydroxytyrosol as such, but a precursor such as aglycon from which tyrosol or hydroxytyrosol is formed spontaneously by hydrolysis during food preparation or shortly thereafter.

Water and oil emulsion spreads which contain olive oil are known. These contain either unrefined or partially refined olive oil. The aqueous phase of such spreads contains a small amount, but less than 10 ppm of tyrosol and hydroxytyrosol, resulting from migration by diffusion from the fat phase into the aqueous phase.

For the manufacture of a spread according to the invention any usual spread manufacturing technology can be used. Preferably, the tyrosol and hydroxytyrosol are dissolved in the aqueous phase or an aqueous phase is used which contains those phenolics and, optionally, other phenolics. Any fat phase usual for spread preparation may be employed.

A particular embodiment provides "in-situ" fortification of the aqueous phase with tyrosol and hydroxytyrosol. The process consists of choosing a non-refined olive oil, optionally mixing it with a margarine fat and emulsifying the fat phase with an aqueous phase with the relatively high pH value of 5.5 or more. Under these conditions hydrolysis of lipophilic olive phenolics occurs at the interphase of fat phase and aqueous phase. The crude emulsion is exposed to the hydrolyzing conditions for such time that a desired amount of hydrophilic phenolic compounds are formed. The process can be stopped, e.g. by lowering the pH to 4.5–5 which is a common value for the aqueous phase of spreads. Subsequently, any remaining spread ingredients are added to the crude pre-emulsion. It is subjected to regular spread processing and a product is obtained with an enhanced content of tyrosol and hydroxytyrosol in the aqueous phase.

When in an emulsion product like spread after manufacture the hydrolysing conditions at the fat and water interface continue to exist and the fat phase still contains unhydrolized phenolics, the fortification of the water phase with hydrolized phenolic compounds originating from the fat phase may proceed even during storage of the product.

Both lipophilic and hydrophilic phenolic compounds are useful food supplements, but never attention was given to a proper balance of both in food products. The present invention enables the beneficial increase of the ratio of hydrophilic phenolic compounds and lipophilic phenolic compounds. It is the merit of the present invention that it provides the specific, above-mentioned food compositions which contain enhanced levels of the potent hydrophilic phenolic compounds tyrosol and hydroxytyrosol.

The invention is illustrated by the following examples:

GENERAL

QUANTITATIVE DETERMINATION OF PHENOLICS PRESENT IN A WATER PHASE

The analytical separations were performed on a Waters 600 S liquid chromatograph equipped with a Waters 616 pump and a Waters 490 UV multiwavelenth detector. Injection of the water samples was carried out by a 10 $\mu$l Rheodyne sample loop. A chrompack 250 mm×4.6 mm×1.4 inch Intersil5 ODS column was applied using a gradient at a flow rate of 1 ml/min. The elution system consisted of a solvent A (2% acetic acid in water) and solvent B (methanol). Gradient: 0–20 min., A/B 85/15%; 20–50 min., increase 15–75% B in A; 50–55 min., A/B 25/75, 55–56 min, increase 75–100% B in A; 56–65 min., 100% B. UV was measured at A 280 nm (for quantification). The column efficiency is shown with a standard mixture of polar polyphenols.

PREPARATION OF A WATER PHASE CONTAINING TYROSOL AND HYDROXYTYROSOL

Two volumes of extra virgin olive oil and one volume of regular tap water obtained from the local tap water supply (city of Vlaardingen, pH 7.5), were vigorously stirred under reduced pressure at a temperature of 22° C. using a mixing device which dissipated about 4 kJ/s of energy per ton of oil. Stirring was discontinued after thirty minutes and oil and water phases were allowed to separate. The aqueous phase, denoted a "olive oil water", containing tyrosol and hydroxytyrosol, was used as the aqueous phase in the following examples.

EXAMPLE 1

| SPREAD PREPARATION | |
|---|---|
| FAT BLEND | |
| 15% | interesterified mixture of 65 wt. parts of palm oil stearin and 35 wt. parts of palm kernel oil |
| 85% | refined sunflower seed oil |

| FAT PHASE | wt. %<br>60 |
|---|---|
| above fat blend | 59.68 |
| Hymono 8903 ™ | 0.22 |
| beta-carotene[1] | 0.10 |
| WATER PHASE | 40 |
| salt | 0.30 |
| K-sorbate | 0.10 |
| "olive oil water" | 26.40 |
| water | 13.20 |
| lactic acid | until pH = 4.5–4.7 |

[1] beta-carotene in the form of a solution of 0.4 wt. % beta-carotene in sunflower seed oil.

The fat phase and the water phase were mixed. The obtained premix was processed employing a laboratory scale Votator™ using an A-A-C sequence.

| Throughput | 4.5–5.0 kg/hr |
|---|---|
| First A-unit | 800 rpm, exit temperature 8° C. |
| Second A-unit | 800 rpm, exit temperature 6° C. |
| C-unit (50 ml) | 250 rpm, exit temperature 12° C. |

The obtained spread was analyzed on phenolics content by the method described above. The concentration of tyrosol and hydroxytyrosol taken together in water phase was 48 ppm.

EXAMPLE 2

| SPREAD PREPARATION | |
|---|---|
| FAT BLEND | |
| 15% | interesterified mixture of 65 wt. parts of palm oil stearin and 35 wt. parts of palm kernel oil |
| 85% | extra virgin olive oil |

| FAT PHASE | wt. %<br>60 |
|---|---|
| above fat blend | 59.68 |
| Hymono 8903 ™ | 0.22 |
| beta-carotene[1] | 0.10 |
| WATER PHASE | 40 |
| salt | 0.30 |
| K-sorbate | 0.10 |
| water | 39.60 |
| lactic acid | until pH = 4.5–4.7 |

[1] beta-carotene in the form of a solution of 0.4 wt. % beta-carotene in sunflower seed oil.

Before the premix was prepared, olive oil and water were mixed at 25° C. for 30 minutes. After 30 minutes the aglycon polyphenols had been hydrolyzed and the hydrolysis products had migrated to the aqueous phase. The temperature was raised to 55° C. First the hardstock fat was added and then the other ingredients. The mixture was processed employing a laboratory scale Votator™ using an A-A-C sequence.

| Throughput | 4.5–5.0 kg/hr |
|---|---|
| First A-unit | 800 rpm, exit temperature 8° C. |
| Second A-unit | 800 rpm, exit temperature 6° C. |
| C-unit (50 ml) | 250 rpm, exit temperature 12° C. |

The obtained spread was analyzed on phenolics content by the method described above. The concentration of tyrosol and hydroxytyrosol together in water phase was 47.5 ppm.

COMPARISON EXAMPLE 2

Example 2 was repeated but the water-phase and the fat phase were prepared separately and only then mixed as usual for spreads preparation. After processing the obtained spread was analyzed on phenolics content by the method described above. The concentration of tyrosol and hydroxytyrosol together in water phase was 38.6 ppm.

EXAMPLE 3

PREPARATION OF A VINAIGRETTE

A vinaigrette was prepared using the following ingredients

| | wt. % |
|---|---|
| Sugar | 7.00 |
| Salt | 2.10 |
| Keltrol TM | 0.35 |
| Alcohol vinegar (12% Hac) | 4.20 |
| Spice vinegar (10% HAc) | 6.00 |
| Dried onion pieces (Dehyfood TM) | 0.50 |
| Dried parsley extra fine (Dehyfood TM) | 0.08 |
| Grinded carrot (Preserven TM) | 0.08 |
| Sorbic acid | 0.10 |
| Trisodium citrate.2 aq | 0.35 |
| "Olive oil water" | 39.62 |
| Tap water | 39.62 |
| | 100.00 |
| PH | 3.74 |

All ingredients except the vinegars and the olive oil water (obtained by the procedure described above) were mixed and heated at 85° C. for 5 minutes. Then the vinegars and the olive oil water were admixed resulting in a vinaigrette which was analyzed on phenolics content by the method described above. The concentration of tyrosol and hydroxytyrosol together in water phase was 31.3 ppm.

EXAMPLE 4

PREPARATION OF A TOMATO SAUCE

A tomatao sauce was prepared using the following ingredients

|  | wt. % |
| --- | --- |
| Salt | 0.5 |
| Tomato paste | 27.58 |
| "Olive oil water" | 35.96 |
| Tap water | 35.96 |
|  | 100.00 |
| PH | 4.18 |

All ingredients except the olive oil water (obtained by the procedure described above) were mixed. Then the olive oil water was admixed resulting in a tomato paste which was analyzed on phenolics content by the method described above. The concentration of tyrosol and hydroxytyrosol taken together in water phase was 34.5 ppm.

What is claimed is:

1. A food composition of which 20–100 wt. % consists of an aqueous phase which aqueous phase contains hydrophilic olive polyphenols, characterized in that the hydrophilic olive polyphenols are tyrosol and hydroxytyrosol, which food composition is a processed food composition selected from the group consisting of water and oil emulsion spreads, processed tomato products and salad dressings, the concentration of tyrosol and hydroxytyrosol taken together in aqueous phase is at least 100 ppm for salad dressings and at least 15 ppm for water and oil emulsion spreads and for processed tomato products.

2. A food composition according to claim 1, characterized in that in the aqueous phase of a salad dressing the concentration of tyrosol and hydroxytyrosol together in aqueous phase is at least 124 ppm.

3. A food composition according to claim 1, characterized in that a fat phase comprising olive oil is present.

4. A food composition according to claim 1, characterized in that the upper limit of the concentration of tyrosol and hydroxytyrosol is either the maximum solubility in water of 4° C. or 20 wt. %, whichever value is the lowest.

5. A food composition of which 20–100 wt. % consists of an aqueous phase which aqueous phase contains hydrophilic olive polyphenols, characterized in that in the aqueous phase of a water and oil emulsion spread or a processed tomato product the concentration of tyrosol and hydroxytyrosol taken together in aqueous phase is at least 30 ppm.

* * * * *